United States Patent [19]

Mueller et al.

[11] Patent Number: 5,297,983

[45] Date of Patent: Mar. 29, 1994

[54] PROCESS AND DEVICE FOR SEPARATING AND PLACING A GUT CATERPILLAR ON A FILLING TUBE

[75] Inventors: Gerhard Mueller; Jochen Stoehr, both of Schemmerhofen, Fed. Rep. of Germany

[73] Assignee: Albert Handtmann Maschinenfabrik GmbH & Co., KG, Biberach/Riss, Fed. Rep. of Germany

[21] Appl. No.: 913,068

[22] Filed: Jul. 14, 1992

[30] Foreign Application Priority Data

Jul. 15, 1991 [DE] Fed. Rep. of Germany ....... 4123432

[51] Int. Cl.$^5$ .............................................. A22C 11/00
[52] U.S. Cl. ......................................... 452/33; 452/25; 452/34
[58] Field of Search ................... 452/33, 32, 25, 21, 452/22, 34

[56] References Cited

U.S. PATENT DOCUMENTS

| | | | |
|---|---|---|---|
| 3,191,222 | 6/1965 | Townsend | 452/33 |
| 3,195,176 | 7/1965 | Washburn | 452/33 |
| 3,672,001 | 6/1972 | Greider | 452/33 |
| 4,153,975 | 5/1979 | Ziolko | 452/32 |
| 4,434,527 | 3/1984 | Staudenrausch et al. | 452/34 |
| 4,489,460 | 12/1984 | Nausedas | 452/34 |
| 4,914,784 | 4/1990 | Nausedas | 452/33 |
| 5,092,814 | 3/1992 | Kasai et al. | 452/32 |

FOREIGN PATENT DOCUMENTS

| | | |
|---|---|---|
| 0391490A1 | 10/1990 | European Pat. Off. . |
| 1432560 | 3/1969 | Fed. Rep. of Germany . |
| 3019981C2 | 3/1981 | Fed. Rep. of Germany . |
| 3024509A1 | 1/1982 | Fed. Rep. of Germany . |
| 2077244A | 12/1981 | United Kingdom . |

*Primary Examiner*—Willis Little
*Attorney, Agent, or Firm*—Finnegan, Henderson, Farabow, Garrett & Dunner

[57] ABSTRACT

A process and device for the separation and placing of a gut caterpillar 1 on a filling tube 2, the gut caterpillar 1 being withdrawn from a storage vessel 3 for storing gut caterpillars with a conveyor device, positioned in front of the filling tube 2 essentially in alignment and slipped onto the filling tube 2 from this position. A simple construction and a high functional reliability of the device, with which the processing of not perfectly formed gut caterpillars 1 is made possible without their kinking or bending is achieved by the fact that the gut caterpillar 1 is slipped onto the filling tube 2 by at least two guide surfaces 5, 22 which rest against its circumference and are driven at the same speed.

15 Claims, 5 Drawing Sheets

PROCESS AND DEVICE FOR SEPARATING AND PLACING A GUT CATERPILLAR ON A FILLING TUBE

The invention relates to a process and a device for the placing and separation of a gut caterpillar on a filling tube, the gut caterpillar being withdrawn from a storage vessel for storing gut caterpillars is delivered to a centering means with a conveyor means, is positioned substantially in alignment in front the filling tube and is placed on the filling tube from this position.

Such a process and a device for placing a gut caterpillar onto a filling tube is of importance in the use of sausage filling machines. The gut caterpillars are sausage skins folded together in concertina-like fashion in their longitudinal direction, which are filled with a plastically deformable composition such as sausage or cheese.

Such a device is known from DE-C-3019981. In this device the gut caterpillars are individually conveyed from the storage vessel into a downwardly inclined guide shaft and perpendicularly disposed one above the other. The bottom portion of the shaft and the side walls form a slide guide upon the slipping on of the lower gut caterpillar onto the filling tube. The slipping on of the lower gut caterpillar is effected by means of a slip-on means adjustable to and fro in parallel to the guide shaft, which engages behind the respectively lower gut caterpillar with a pivotable finger. In order to make it possible that gut caterpillars of different diameters can be brought onto a filling tube with the same device, both the side walls of the shaft and the bottom of the shaft are adjustably designed.

A sausage filling machine is also known from DE-A-3024509. There, the sausage skins are individually withdrawn from a magazine and delivered to a centering means by means of a conveyor means, in which the sausage skin rests between a receiver and an adjustable counter-holder. The counter-holder must be pivoted for receiving and centering the sausage skin. The entire centering means is guided with the sausage skin in front of the filling tube by means of a downward movement and a pivoting movement. There, the sausage skin is slipped onto the filling tube by means of a pneumatically actuable working cylinder provided on the centering means.

The devices of the prior art described above are disadvantageous inasmuch as they require a great apparatus expenditure for centering and placing the gut caterpillars. Because various parts of the device must be designed in pivotable or adjustable fashion in order to ensure an exact centering of the gut caterpillars with respect to the filling tube. Moreover, it is disadvantageous that a kinking or bending of the gut caterpillars is possible when slightly bent or mechanically instable gut caterpillars are slipped on. Gut caterpillars with partly loosened gather cannot be processed well, since they can be easily bent and easily damaged at the points without gather during slipping on.

A machine for the production of sausages is moreover known from DE-OS 1432560, in which the gut caterpillars individually run on a slide under their own weight, which then brings the gut caterpillar transversely to its length against a further spring-loaded slide to a slip-on position. There the filling tube is advanced into the sausage skin held between the two slides. Thereafter the slides acting on the sausage skin in gripper-like fashion is detached again from the gut caterpillar. However, only dimensionally stable gut caterpillars of plastic material can be processed in this device. But the technical expenditure is very great in this centering and placing process of the gut caterpillars.

The invention is based on the object to provide a device for placing a gut caterpillar on a filling tube, which has a high functional reliability with a simple construction and also makes a processing of not perfectly formed gut caterpillars possible without their kinking or bending.

In accordance with the invention, the gut caterpillar rests on at least two guide surfaces resting against its circumference, so movement of the gut caterpillar relative to the guide surfaces is avoided. Due to this, any damage, such as a kinking or bending of the gut caterpillar, is also prevented if the gut caterpillar is soft, mechanically unstable or slightly bent. A deformation or kinking of points of the gut caterpillar where the gather is loosened is also avoided. Since the gut caterpillar is also not in contact with other gut caterpillars, a mutual damage of the gut caterpillars among each other is excluded. All forces of the relative movement of the gut caterpillar with respect to stationary device parts and other gut caterpillars are thus avoided.

Since the gut caterpillar is drawn onto the filling tube by a forward movement of the guide surfaces driven at the same speed in the centering means, no additional contrivances such as a slip-on means with pivotable finger or a pneumatically actuated cylinder for placing the gut caterpillar on the filling tube are necessary. The centering and the slipping on of the gut caterpillar is also carried out in one process. The device is therefore of a simple construction. Moreover, it has a high functional reliability, since no unnecessary pivoting or sliding movements of the individual parts of the device are necessary which lead to wearing phenomena in the case of a constant use of the device, due to which a backlash of the individual pivoting elements of the device is formed, which leads to inaccuracies in positioning.

According to a advantageous further development of the invention a guide surface extends in a plane below the filling tube from the gut caterpillar receiving point to below the filling tube. This had the advantage that the gut caterpillar is transported directly from the receiving point to the slip-on position. The length of the movable guide surface is not unnecessarily large in this design. It is also advantageous if an elevated burl is disposed at the end of a guide surface. It is avoided due to such a burl that upon the acceleration of the gut caterpillar for the slip-on process it can rearwardly evade. Moreover, it is especially simple if a guide surface is designed as a belt conveyor. The belt conveyor can then comprise an endless belt which is deflected in simple fashion by means of 2 deflection rollers.

Moreover, it is advantageous if the belt conveyor is of a V-shaped cross-sectional design and the two guide surfaces are formed by the two belt sections extending in inclined V-shaped fashion. Due to this the horizontal centering of the gut caterpillar is possible with only one guide surface for gut caterpillars of different thicknesses. Gut caterpillars of the caliber 13 to 17 mm and with calibers from 40 to 130 mm can be horizontally centered with one guide surface each due to the V-shaped support. If gut caterpillars of a small caliber are used, it is advantageous if the V-shaped guide surface is of a plane design in the area in which the filling tube is swung in and out. The guide surface can advantageously be formed of V-shaped burls. If gut caterpillars of a small caliber are used, the burls in the swing-in and swing-out area of the filling tube are omitted.

According to a further advantageous example two guide surfaces can be disposed in such fashion that they are of a V-shaped shape. Both guide surfaces may be disposed in spaced relationship so that the gut caterpillar rests between the two guide surfaces.

According to a further advantageous development of the invention a centering element is provided above and directly in front of the filling tube. The slip-on process of the gut caterpillar onto the filling tube is additionally supported with this centering element, and a still better centering of the cut caterpillar with respect to the filling tube is ensured. The centering element can be driven or it can be of a stationary design.

In order to be able to use the device for gut caterpillars with different diameters, it is advantageous if the centering element and the guide surfaces are disposed vertically adjustably. The two can then be jointly adjusted in their height via a threaded spindle.

It is furthermore advantageous to design the storage vessel in water-tight fashion, since the gut caterpillars such as fibrous guts can then be soaked in the storage vessel prior to processing. The soaking of fibrous guts is thus possible during the operation of the device. The design of the storage vessel with the inclined bottom surface and bottom wall makes a large storage capacity of gut caterpillars and thus long refilling intervals possible. The gut caterpillars must only be filled directly from the storage cardboard box into the storage vessel by an operator after such a period of time. In order to facilitate such a lifting, the cardboard boxes are partly provided with expedients such as lifting foils. The remaining processes from the withdrawal of the gut caterpillar from the storage vessel until the placing of the gut caterpillar on the filling tube take place automatically without further interventions of the operator being necessary.

The invention is described in greater detail in the following by means of the drawing.

Figure 1:
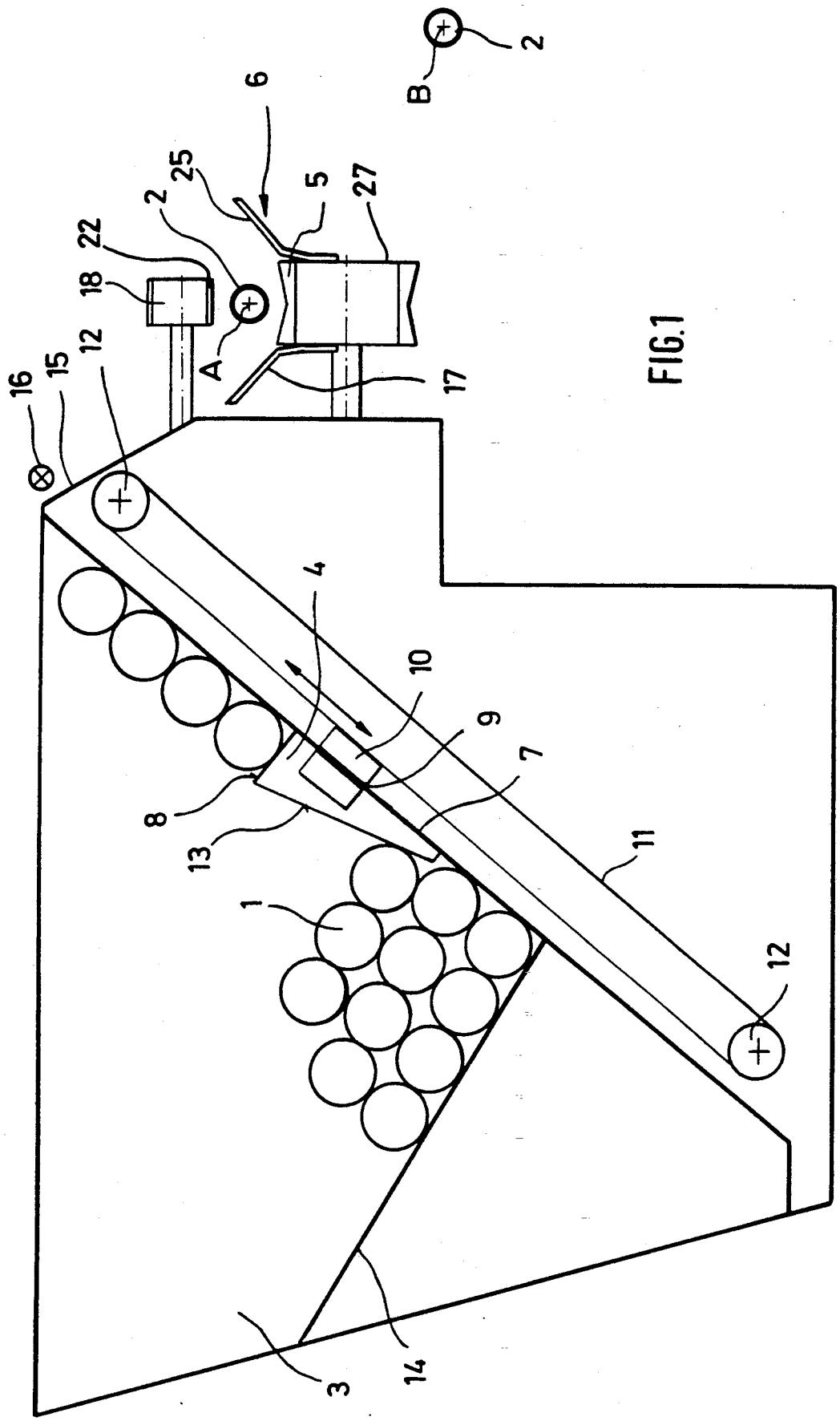
FIG. 1 shows the device according to the invention in cross-sectional view.

FIG. 1 shows a device for separating and placing gut caterpillars 1 on a filling tube 2 in a cross-sectional view. The gut caterpillars 1 are located in a storage vessel 3. The gut caterpillars 1 are individually withdrawn from the storage vessel 3 by means of a slide 4 and supplied to a guide surface 5 of a centering means 6. The filling tube 2 is in a slip-on position A. The guide surface 5 which is disposed in a plane below the filling tube 2 and extends from the gut caterpillar receiving point to below the filling tube 2 is movable in the direction towards the filling tube 2 so that the gut caterpillar resting on the guide surface 5 is slipped onto the filling tube 2 by a forward movement of the same speed as that of the guide surface 5 and the guide surface 22 of a centering element 18.

The storage vessel 3 has a bottom wall 7, which has a rising angle of inclination with respect to the horizontal. The slide 4 is disposed on the bottom wall 7. It has a lifting surface 8, whose width is designed to match the diameter of gut caterpillars 1 having a caliber of from 13 to about 130 mm. Due to this, the gut caterpillars 1 can be transported to the upper end of the storage vessel 3 reliably and without damage. Since the angle of inclination of the bottom wall 7 is so large that an automatic rolling back of the upper gut caterpillars 1 is made possible, the slide 4 only transports one row each of superimposed gut caterpillars 1 to the upper end of the storage vessel 3.

The slide 4 is guided along the bottom wall 7 of the storage vessel 3 via two magnetic couplings 9. The guide magnet 10 of the magnetic couplings 9 is fastened to an endless conveyor belt 11, which is guided via two conveyor rollers 12. The slide 4 is movable both in and contrary to the direction of conveying. A limit switch is disposed in each case at the upper and lower end of the bottom wall 7 of the storage vessel 3, which is tripped by the slide 4 and reverses the direction of movement of the slide 4. Thus, the slide 4 can be moved automatically and without a connection to the outside of the storage vessel 3 in and contrary to the direction of conveying along the bottom wall 7. The side 13 of the slide 4 pointing contrary to the direction of conveying is designed as an oblique surface so that the gut caterpillars 1 are not damaged upon the returning of the slide 4 to the lower end of the bottom wall 7. The conveyor belt 11 and thus the slide 4 are excited by means of a d-c motor permanently excited by a magnet.

The storage vessel 3 has a bottom surface 14, which is inclined in the direction of the bottom wall 7. Due to this, the gut caterpillars 1 present in the storage vessel 3 roll in the direction of the slide 4 due to their own weight so that they can be conveyed to the upper end of the bottom wall 7 by it. A recess is formed in the bottom surface 14, which receives the slide 4 when it is moved contrary to the direction of conveying, so that the surface 8 of the slide 4 can be retracted behind the bottom surface 14 so that all gut caterpillars can be engaged by surface 8 and conveyed out of the storage vessel 3.

Since the storage vessel 3 does not have any connection to the outside, e.g. for driving the slide 4 and is designed in such fashion that the gut caterpillars 1 are conveyed individually out of the storage vessel 3, the storage vessel 3 can be of a water-tight design. Due to this, the gut caterpillars 1, e.g. fibrous guts, can be soaked in the storage vessel 3 prior to processing and during operation of the device.

The storage vessel 3 is of an acute-angle design at the upper end of the bottom wall 7. The one leg is formed by the bottom wall 7, the other leg by a rolling surface 15, via which a gut caterpillar 1 falls onto the guide surface 5 of the centering means 6.

A sensor 16 is disposed above the rolling surface 15, which serves for detecting a rolling gut caterpillar 1. A light barrier is typically used as a sensor 16. A feeding web 17 extending at an oblique angle to the guide surface 5 is disposed on the centering means 6 at a side of the guide surface 5, which bridges the distance between the guide surface 5 and the outer wall of the storage vessel 3 upon the delivery of the gut caterpillar 1 from the storage vessel 3 to the guide surface 5. Thus the gut caterpillar is reliably guided onto the guide surface and cannot be clamped between storage vessel 3 and the centering means 6 or fall through.

A collecting web 25 is formed on the opposite side of the guide surface 5, which prevents the gut caterpillar 1 from rolling over the edge of the guide surface 5 and falling off the centering means 6.

A centering element 18 is disposed above and directly before the filling tube 2, by means of which a still better centering and a more uniform and reliable slipping on of the gut caterpillar 1 onto the filling tube 2 is ensured.

Figure 2:
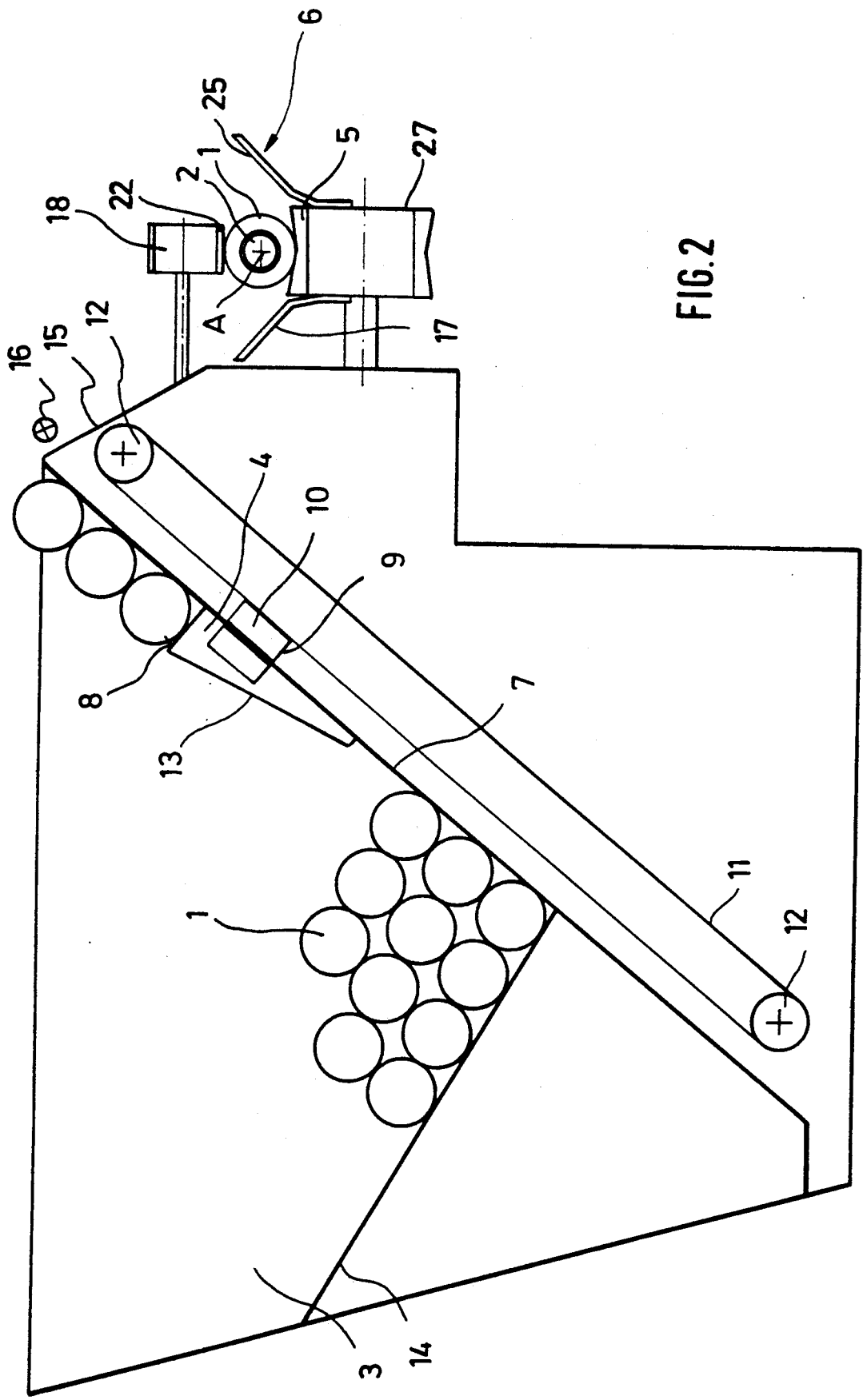
FIG. 2 shows the device according to the invention in a cross-sectional view with a gut caterpillar in slip-on position.

FIG. 2 shows the device of FIG. 1 in the same cross-sectional view. The gut caterpillar has already been fed to the guide surface 5 of the centering means 6 and is in the centering and slip-on position in front of the filling tube 2.

Figure 3:
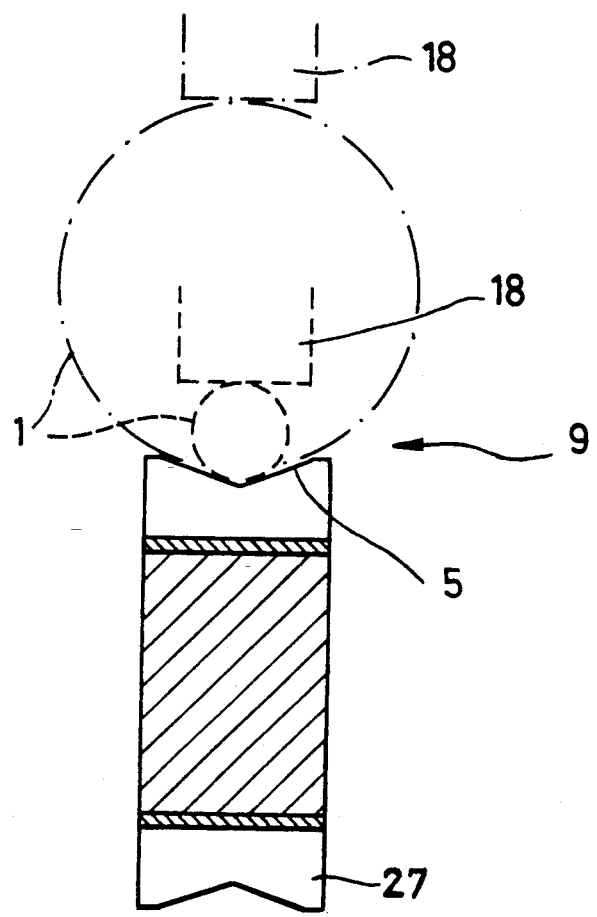
FIG. 3 shows a guide surface of a centering means in a cross-sectional view in accordance with FIG. 1.

FIG. 3 shows an enlarged representation of part of the centering means 6, which comprises the guide surface 5. The guide surface 5 is of a V-shaped design.

Due to this, an exact and reliable centering of the gut caterpillar 1 is ensured, which is largely independent of the diameter of the gut caterpillar 1. Two gut caterpillars of very differing diameters are represented in FIG. 3, both of which can be centered by means of the same guide surface 5. It is possible in this guide surface 5 to center gut caterpillars having a caliber of from 13 to 70 mm or, in the case of a larger guide surface 5, gut caterpillars 1 having a caliber of from 40 to 130 mm with one guide surface each. Thus, only two different guide surface variants need be used for the entire range from 13 to 130 mm.

Figure 4:
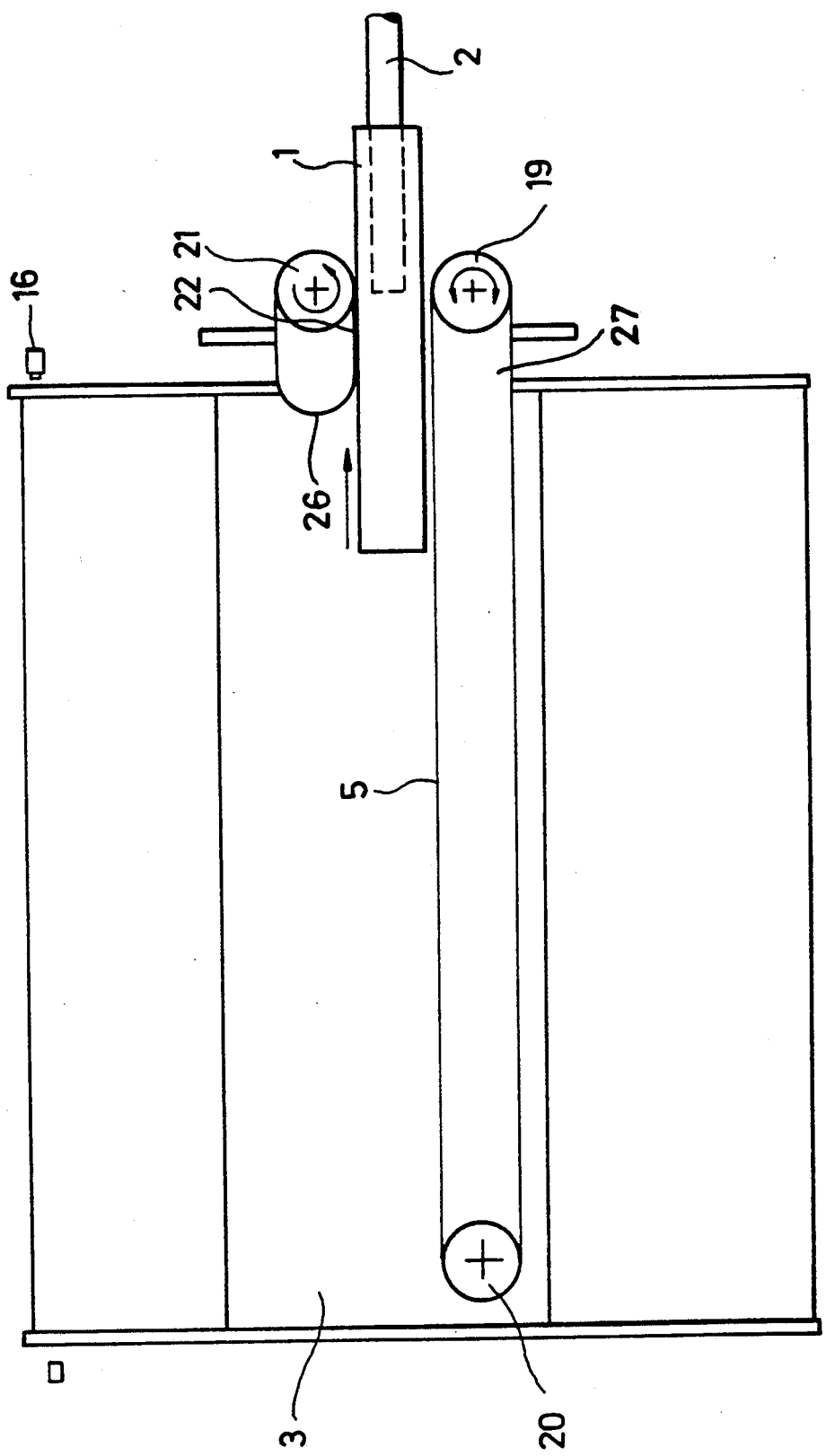
FIG. 4 shows a lateral view of the device of FIG. 1 and FIG. 2.

The guide surface 5 is designed as a belt conveyor, in which an endless belt is deflected via two deflection rollers 19, 20. This is represented more accurately in the view of FIG. 4. The centering element 18 is a shorter belt conveyor, in which the endless centering belt 26 is deflected about two centering rollers 21. The centering element 18 and the guide surface 5 have a joint drive. Due to this the device is simplified and it is moreover ensured that the slipping on of the gut caterpillar 1 onto the filling tube 2 is carried out uniformly, since the speed of the centering element 18 and the guide surface 5 are matched.

The centering element 18 has a flat cross-sectional surface 22 so that the same centering element 18 can be used for gut caterpillars 1 irrespective of their diameters. The centering element 18 is moreover disposed vertically adjustably so that the centering element 18 can be adjusted to the different diameters of the gut caterpillars 1.

The guide surface 5 can also be disposed vertically adjustably. For this, centering element 18 and guide surface 5 can both be adjusted via an appropriate threaded spindle (not shown) with right-hand and left-hand threads.

Figure 5:
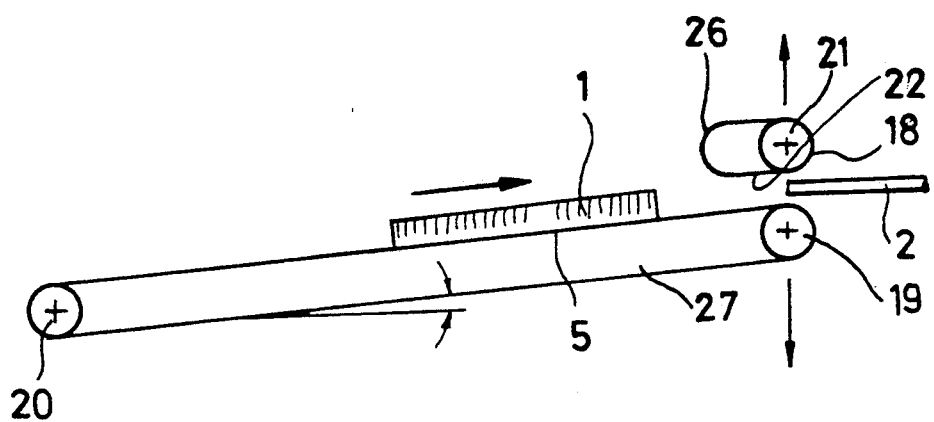
FIG. 5 shows a lateral view of the centering means for placing a gut caterpillar of small diameter and FIG. 6 shows the centering means of FIG. 4 for placing a gut caterpillar of large diameter.
Figure 6:
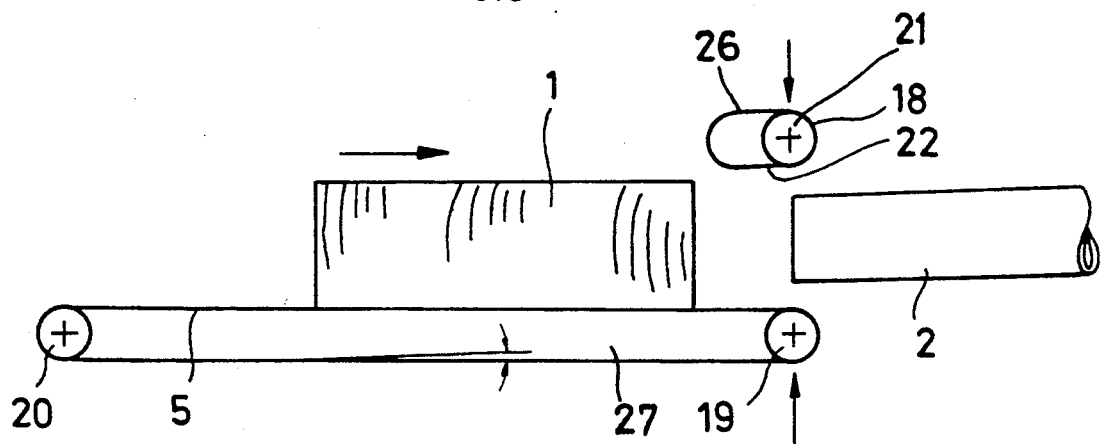

The guide surface 5 is stationary at the end where it passes around roller 20 and located at the gut caterpillar receiving point, while the end of the guide surface 5 facing the filling tube is adjustable centrically to the filling tube. The centering means 6 can be adjusted to different diameters of the gut caterpillars 1 by pivoting the guide surface 5 about the stationarily mounted deflection roller 20 with the vertical adjustment. This is represented in FIGS. 5 and 6. The drive of the guide surface is effected at the stationary end of the deflection roller 20 of the guide surface 5.

The drive of conveyor belt 5 and of the centering belt 18 is effected via a second d-c motor permanently excited by a magnet, the centric adjustment of the guide belt 5 via a third d-c motor permanently excited by a magnet. A superordinate electronic control unit is provided for controlling the d-c motor permanently excited by a magnet.

The process according to the invention is explained in the following. The gut caterpillars 1 are directly filled into the storage vessel 3 from a cardboard box by an operator. Due to the bottom surface 14 designed in inclined fashion, the gut caterpillars 1 roll in the direction of the lower end of the obliquely designed bottom wall 7. A row of the gut caterpillars 1 is guided to the upper end of the inclined bottom wall 7 of the storage vessel 3 by slide 4 which is driven from the outside by means of the magnetic coupling 9. The upper gut caterpillars 1 roll back due to the inclination of the bottom wall 7 so that only one row of the gut caterpillars 1 is upwardly conveyed. When the upper gut caterpillar 1 reaches the acute end of the storage vessel 3, the gut caterpillar 1 rolls down the rolling surface 15 and the feeding web 17 onto the guide surface 5. The gut caterpillar 1 is detected by the light barrier 16 during rolling. The conveying movement of the slide 4 is stopped by a superordinate electronic unit.

If there are no gut caterpillars 1 on the front of the slide in the direction of conveying, the slide 4 trips a limit switch at the upper end of the bottom wall 7, whereby the direction of movement of the slide 4 is reversed. Then the slide 4 moves backwards to the lower end of the bottom wall 7 where it trips a lower limit switch, whereby the direction of movement of the slide is again reversed and it moves again upwardly and conveys the gut caterpillar 1, if one of the gut caterpillars 1 is to be delivered to the guide surface 5.

The gut caterpillar 1 now resting on the guide surface 5 is guided to the filling tube 2 located in the slip-on position A and slipped onto the same. Since the gut caterpillar is not moved relatively to the guide surface 5 and no additional forces act on the gut caterpillar by further surfaces, the gut caterpillar is slipped onto the filling tube 2 without being damaged. Slightly bent or mechanically instable gut caterpillars are also slipped on without kinking or bending. Gut caterpillars 1 with partly loosened gather can be processed without problems. If the gut caterpillar 1 has been slipped onto the filling tube 2, it is pivoted away from the slip-on position A to the filling position B. (FIG. 1) There the gut caterpillars 1 are filled with a plastically deformable composition such as sausage or cheese.

During the filling process, a signal for delivering a further gut caterpillar 1 from the storage vessel 3 is emitted so that the slide 4 moves further upwardly along the bottom wall 7 and the delivery process begins again. After the filling process the filling tube 2 is again pivoted back into the slip-on position A and the gut caterpillar 1 resting on the guide surface 5 can be slipped onto the filling tube 2.

If the storage vessel 3 is empty and if gut caterpillars 1 of another diameter are to be processed, the centering device 6 is correspondingly adjusted. The guide belt with the guide surface 5 is pivoted about the stationary deflection roller 20 into the desired position. The centering element 18 and the guide surface 5 are jointly adjusted in their height, until the centering means 18 is adjusted to the diameter of the gut caterpillar 1.

Then the storage vessel 3 is filled again and the entire process begins anew.

Two contacts points are formed at the gut caterpillar at every bent belt section in the design of the guide surface 5 with V-shaped cross-section so that the two belt sections can also take over the function of the two guide surfaces. Therefore it is not imperative to drive the centering element 18. A guide and centering surface being stationary can rather also be used here.

We claim:

1. A process for feeding a longitudinally extending, annular shaped caterpillar gut onto an end of a filling tube for filling the gut comprising withdrawing caterpillar guts from a storage vessel holding a plurality of said guts and delivering them one at a time to a position in front of said end of said filling tube so that an end of said longitudinally extending gut is in alignment with the axis of said tube, contacting the circumferential surface of said aligned gut at at least two separate points with two guide surfaces and moving both said guide surfaces at the same speed toward said filling tube to thereby feed said gut axially onto said tube.

2. The process of claim 1, including adjusting at least one of said guide surfaces relative to the other guide surface to accommodate caterpillar guts of different diameters.

3. The process of claim 1, including immersing said caterpillar guts in a liquid in said storage vessel.

4. A device for feeding a longitudinally extending, annular shaped caterpillar gut onto an end of a filling tube for filling the gut comprising a storage vessel for holding a plurality of caterpillar guts, conveyor means for withdrawing and delivering said caterpillar guts one at a time from said storage vessel to a receiving position on a centering means located in front of said end of said filling tube so that an end of said longitudinally extending gut faces said filling tube end, said centering means comprising at least two guide surfaces that receive and are in contact with the longitudinal sides of said gut at two circumferentially spaced locations, said surfaces holding said gut so that said end of said gut is in axial alignment with said end of said filling tube and drive means for moving said two guide surfaces at the same speed toward said filling tube end to feed said caterpillar gut from said receiving position on the centering means axially onto said filling tube.

5. The device of claim 4, wherein at least one guide surface is located below the plane of the filling tube and extends in an axial direction away from said filling tube end from a point immediately below said end to at least said receiving position.

6. The device of claim 5, wherein said at least one guide surface is a conveyor belt driven by said drive means.

7. The device of claim 6, wherein said other guide surface is located above the plane of the filling tube and immediately above said end of said tube.

8. The device of claim 7, wherein said other guide surface is a conveyor belt driven by said drive means.

9. The device of claim 6, wherein the conveyor belt is V-shaped in cross section and has two mutually inclined belt portions, said two portions being said two guide surfaces.

10. The device of claim 9, including a further guide surface located above the plane of the filling tube and immediately above said end of said tube.

11. The device of claim 10, wherein said further guide surface is a conveyor belt driven by said drive means.

12. The device of claim 7, including means for adjusting the distance between said guide surfaces relative to the axis of the filling tube to accommodate caterpillar guts of different diameters.

13. The device of claim 9, including means for adjusting the distance between said V-shaped conveyor belt and the axis of the filling tube to accommodate caterpillar guts of different diameters.

14. The device of claim 10, including means for adjusting the distance between said V-shaped conveyor belt and said further guide surface relative to the axis of the filling tube to accommodate caterpillar guts of different diameters.

15. The device of claim 4, wherein the storage vessel holds the plurality of caterpillar guts immersed in a liquid.

* * * * *